Feb. 4, 1947.  S. P. LOVELL ET AL  2,415,391
PROCESS OF MAKING GAS MASKS
Filed Oct. 22, 1942   5 Sheets-Sheet 1
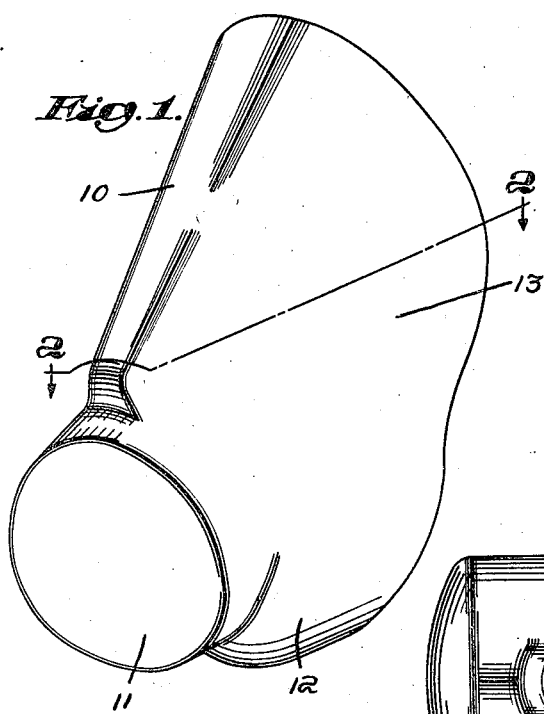
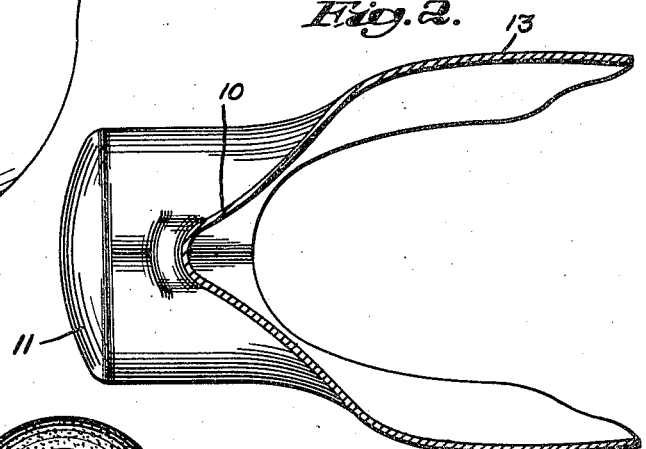
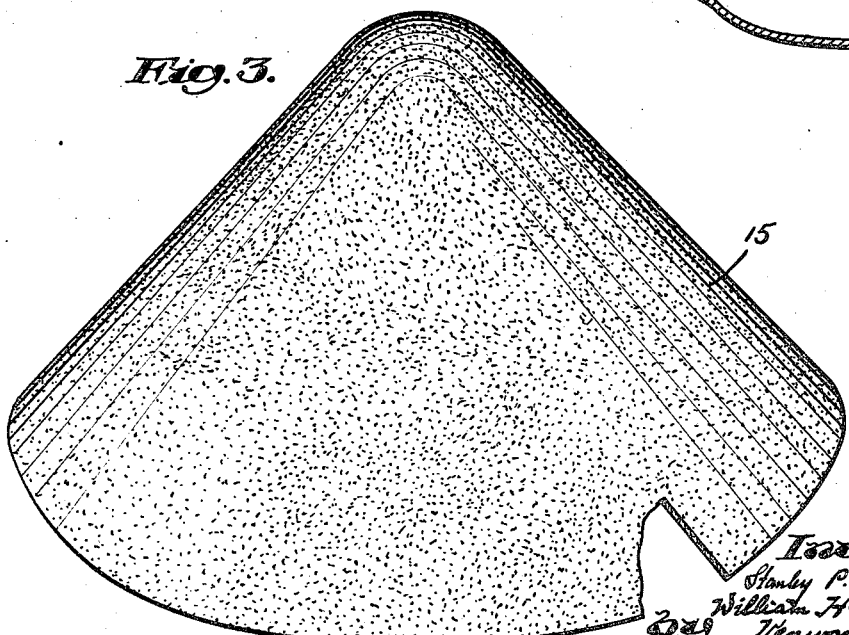

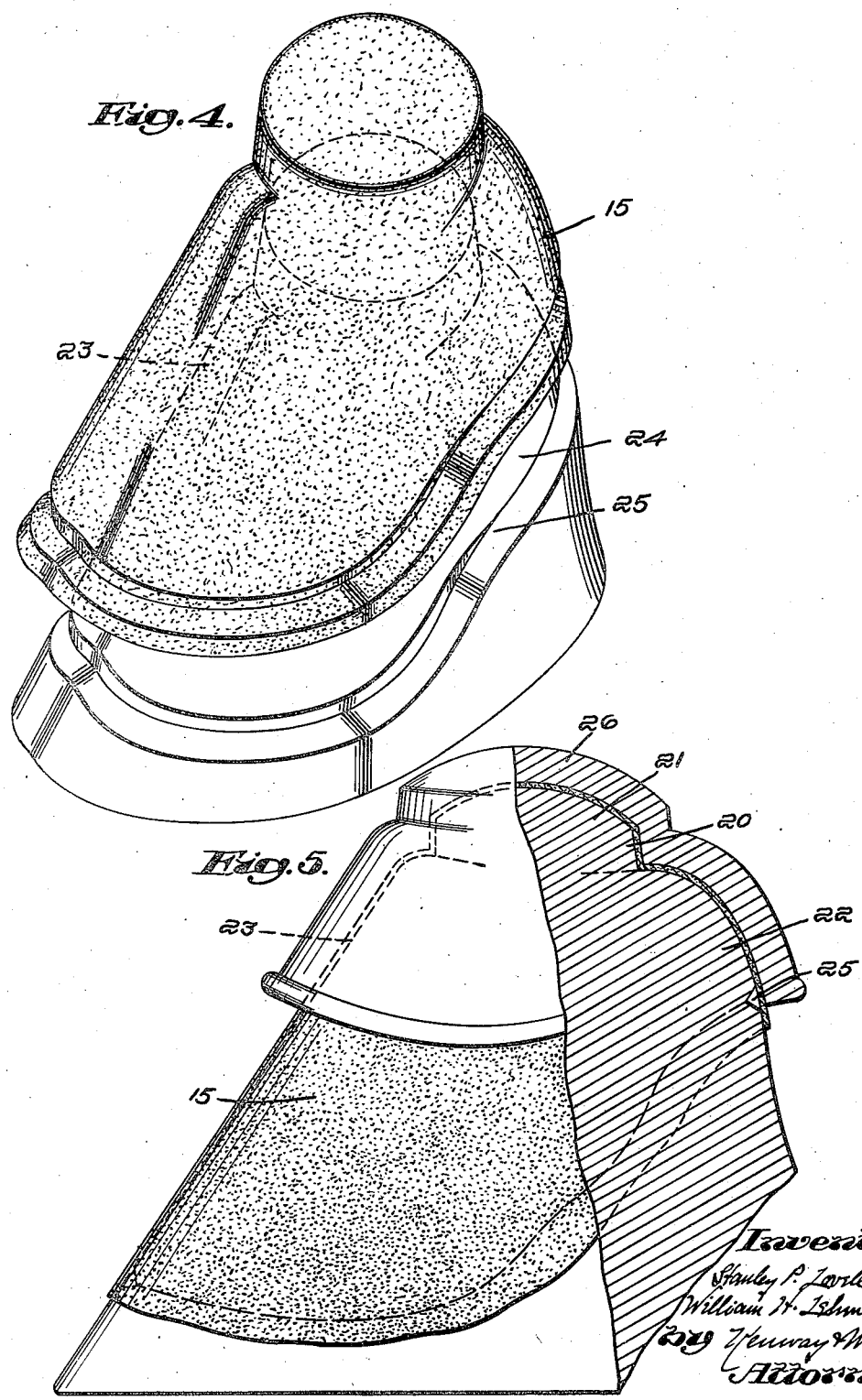

Feb. 4, 1947.  S. P. LOVELL ET AL  2,415,391
PROCESS OF MAKING GAS MASKS
Filed Oct. 22, 1942  5 Sheets-Sheet 3
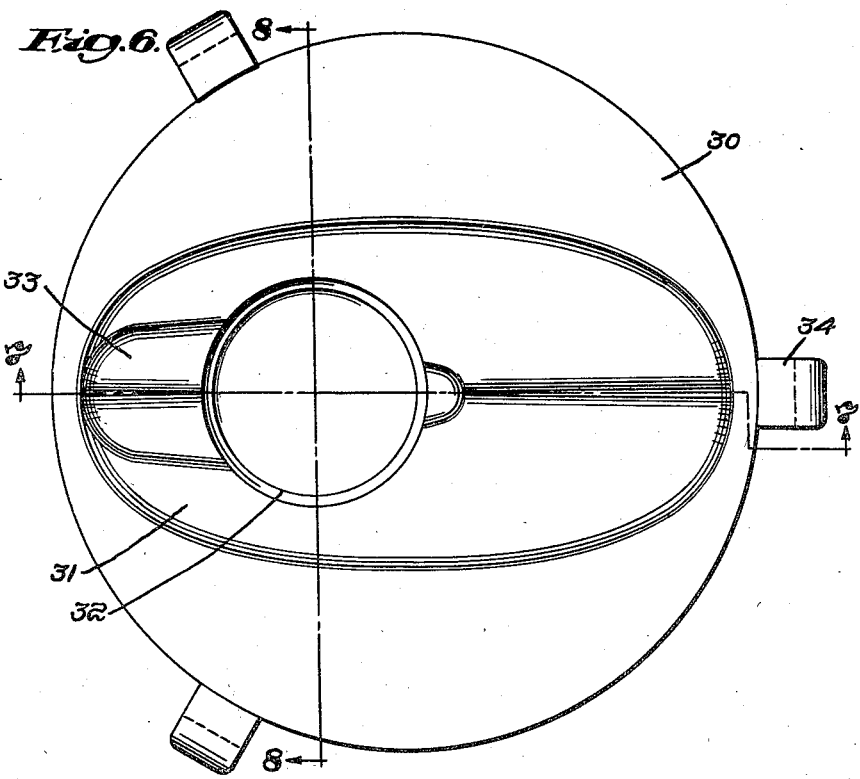
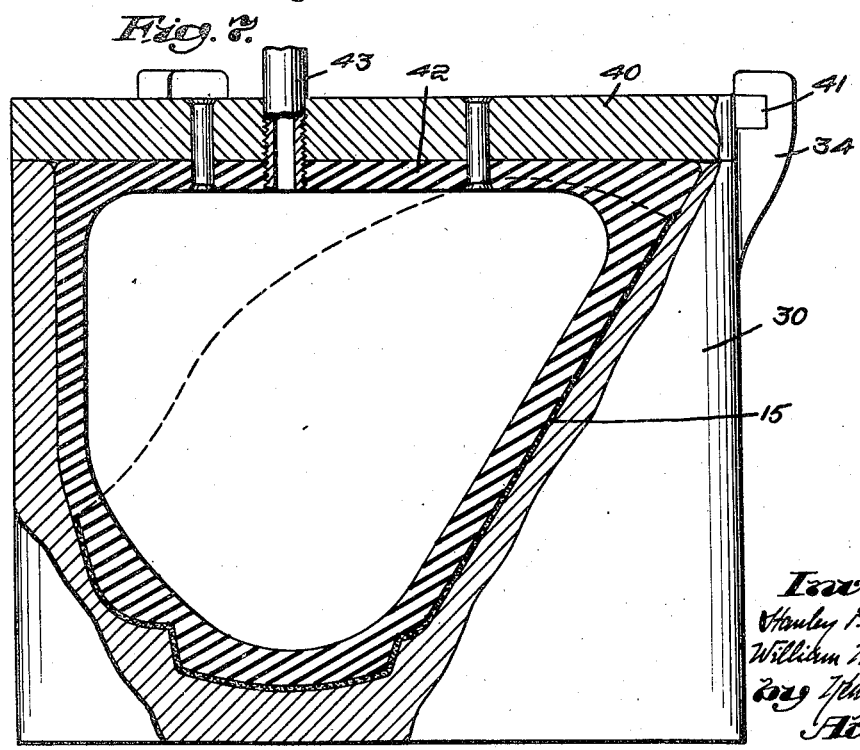

Feb. 4, 1947. S. P. LOVELL ET AL 2,415,391
PROCESS OF MAKING GAS MASKS
Filed Oct. 22, 1942 5 Sheets-Sheet 4
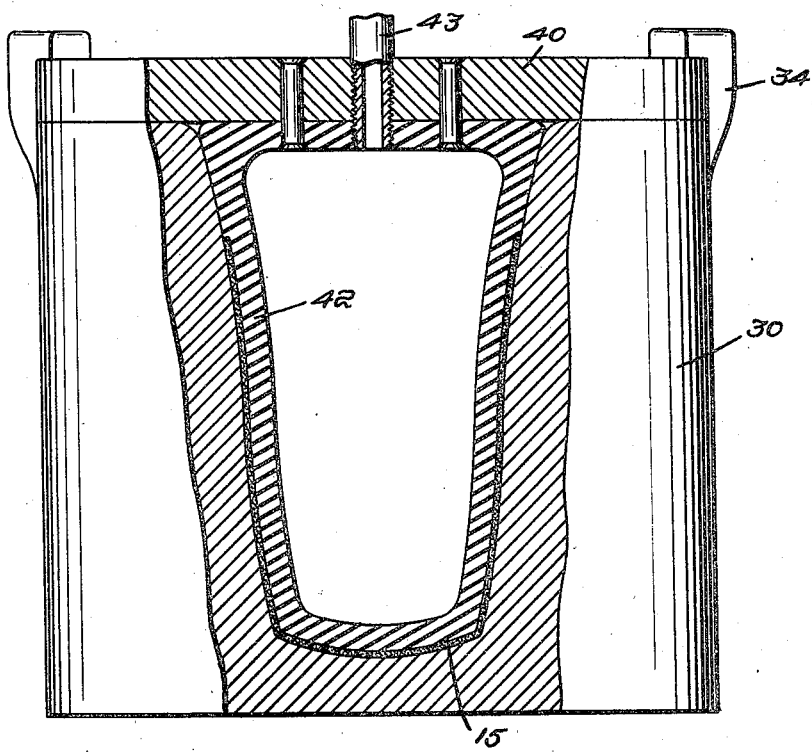
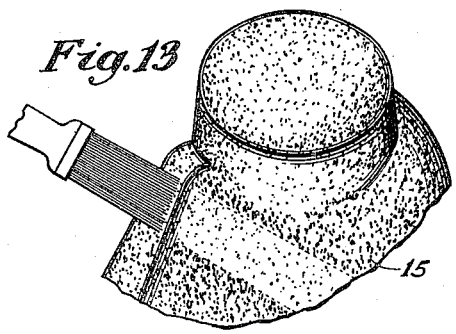
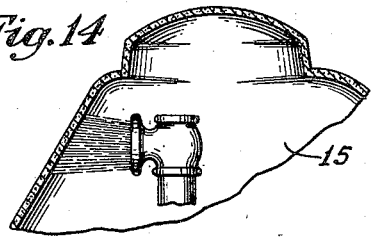
Inventors:
Stanley P. Lovell & William H. Blumberg
by Kenway & Witter
Attorneys Feb. 4, 1947.  S. P. LOVELL ET AL  2,415,391
PROCESS OF MAKING GAS MASKS
Filed Oct. 22, 1942  5 Sheets-Sheet 5
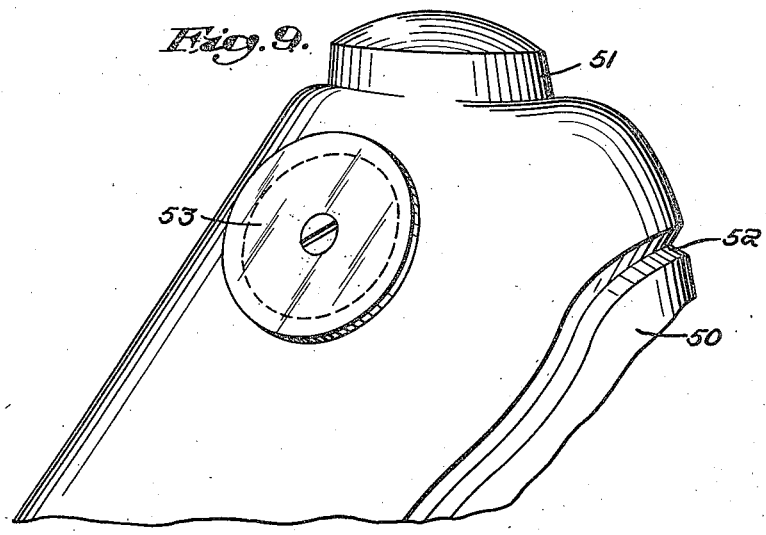
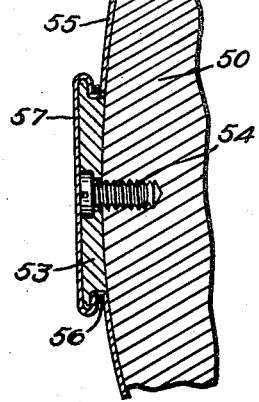
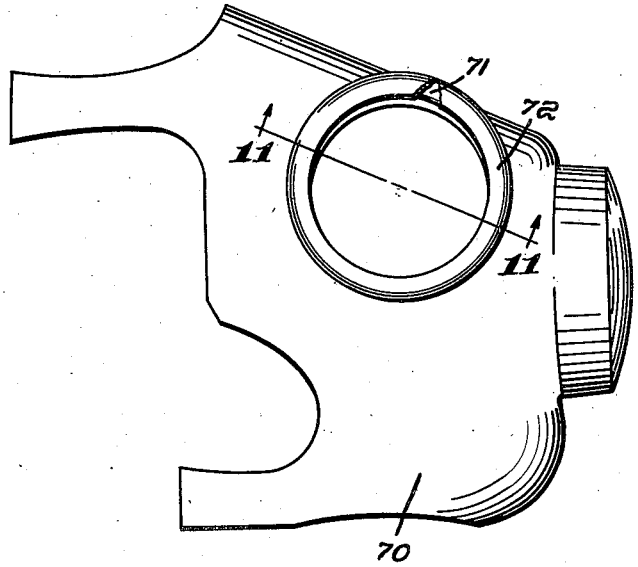
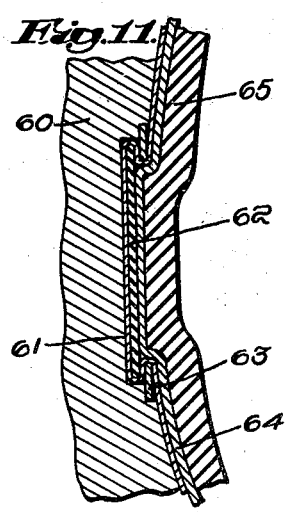

Patented Feb. 4, 1947

2,415,391

UNITED STATES PATENT OFFICE 2,415,391

PROCESS OF MAKING GAS MASKS

Stanley P. Lovell, Newtonville, and William H. Lehmberg, Newton Center, Mass., assignors to Beckwith Manufacturing Company, Dover, N. H., a corporation of New Hampshire Application October 22, 1942, Serial No. 462,906

8 Claims. (Cl. 18—56)

1

The present invention consists in a new and improved face piece for use in the construction of gas masks and includes within its scope a novel process of producing the same.

Heretofore rubber has been regarded as an indispensible constituent of gas masks although the useful life of masks made of rubber has been limited by oxidation which inevitably occurs in long continued use.

An important object of the present invention is to make available a protective face piece having no rubber in its composition, but which may be used in producing a gas mask superior in several respects to all previously known masks, not only in its length of useful life, but in that it possesses the utmost facial conformability, tends normally to maintain its three dimensional contour even after distortion, and may be produced with an economy of manufacture not heretofore realized.

We have discovered that by carrying out special shaping molding, pressing and coating steps we may utilize in our improved face piece a fibrous or felted body molded in three dimensions as an integral article with the majority of its fibres laid down in situ, so that no initial stress or distortion is imparted to the fabric of the structure. We then apply a film-forming solution to one or both the surfaces of the molded body of the face piece and deposit thereon a continuous coating which is not only impervious to gas but which imparts a natural resilience to the molded body.

Preferably, and as herein shown, a resilient gas-impervious coating is applied to both sides of the molded fibrous body. The molded face piece thus comprises an intermediate layer of untreated flexible felt enclosed by thin impervious walls or films of resilient material. As a result the molded body tends to maintain its three dimensional contour, to fit accurately the face of the wearer, and while yielding to distortion when packed or flattened, tends naturally and of its own accord to reassume its original contour when the distorting force is removed.

While a single gas-impervious resilient coating is adequate in many instances, it is preferred to apply such coatings to both the inner and outer surfaces of the face piece, partly to render the article more sanitary and convenient for decontamination, and partly because an interior coating facilitates imparting a pebbled or shell surface to the skin-engaging portions of the face piece. This has been found desirable in order to bring about a close fitting of the mask without sealing off the pores of the skin, and also to reduce or eliminate any tendency of the mask to bridge hollows in the contour of the face.

As a satisfactory coating we may use asphalt dissolved in a suitable organic plasticizer, or ethyl cellulose plasticized to a high degree or any other solution capable of supplying a continuous gas-impervious and somewhat resilient film when deposited upon the fibrous body by evaporation of its solvent or carrier. It is highly desirable that the solution should be of such character and viscosity as to coat and surround the surface fibres without locking and binding together the internal fibres of the felted body or the face piece to a degree that would impair the desired flexibility in the finished article.

These and other features and characteristics of the invention will be best understood and appreciated from the following description of one preferred embodiment of the face piece shown herein for purposes of illustration, together with steps illustrating one desirable process of its manufacture.

In the accompanying drawings—

Fig. 1 is a view in perspective of the finished face piece,

Fig. 2 is a sectional view on the line II—II of Fig. 1,

Fig. 3 is a view in elevation of the conical blank in which the fibres are arranged as they are taken off the card, Fig. 4 is a view in perspective of the convex or male mold showing the molded blank partially removed therefrom, Fig. 5 is a view in elevation partly in cross section showing the mold of Fig. 4 with the cooperating concave die in place thereon, Fig. 6 is a plan view of the concave die used in the final molding step, Fig. 7 is a cross sectional view showing the same die in partial section on the line VII—VII of Fig. 6, together with the expansible bag used in the final molding step, Fig. 8 is a view partly in elevation and partly in cross section on the line VIII of Fig. 7, Fig. 9 is a view in elevation showing the male mold or die as equipped with a boss for molding a projecting eye piece section, Fig. 10 is a fragmentary sectional view showing the formation of the projecting eye piece section, Fig. 11 is a fragmentary view in section illustrating the molding step as carried out on this section of the mask, and Fig. 12 is a fragmentary view showing the complete eye piece section in the face piece.

Fig. 13 is a fragmentary view in perspective illustrating the exterior coating step, and Fig. 14 is a fragmentary view illustrating the interior coating step.

The protective face piece which is the subject matter of this application is shown in its complete form in Fig. 1. It is the foundation element of the gas mask and resembles in general appearance a somewhat grotesque enlargement of the human face. It includes what may be termed a combined nose and forehead section 10, a convex circular mouth or canister section 11, a bulging chin section 12 and convex lens or eye piece aperture sections 13 in the cheek portions of the mask. The circular mouth and chin sections are molded in distinct and clear-cut shapes while the rest of the face piece has gradually curving contours which merge into each other without definite boundaries. A definitely shaped chin cavity is important since in fitting the mask the securing straps pull against this part of the face piece. This portion of the mask may advantageously make an air-tight fit with the chin portion of the face, and so provide a secondary seal in addition to the seal of the mask as a whole, this secondary seal being effective regardless of possible distortion of the mask due to pull of the head straps.

We prefer to employ a wool fibre in the construction of our face piece, but may employ any type or mixture of fibres suitable for producing a firm felted structure. Many such mixtures are well known and commonly employed in the felt making industry. That best suited to the present requirements includes about 25% of new long fibre wool and about 75% French noils. The selected fibres are first carded as usual into a thin bat and then this is taken off the card in hollow, three-dimensional form, specifically in the form of a double cone upon a suitable rotary former. The double ended conical form thus produced is then cut circumferentially and two hollow conical blanks of lightly felted fibre are thus provided. The conical blanks are then hardened and fulled, for example by mechanical manipulation and acid shrinkage of the fibres, tensile strength and solidity being imparted to the blank in this stage. A conical blank 15 in this condition is shown in Fig. 3.

The fulled conical blank is now pulled over an aluminum body former or male mold or die as suggested in Fig. 4. In this pulling over operation the blank 15 is heated and moistened so that it may readily take the mold form.

The mold, as shown in Figs. 4 and 5, may comprise a solid body of aluminum or other suitable material disposed in upright position and having the contour desired in the completed face piece. The mold has a shallow cylindrical portion 20 merging upwardly into a circular convex end surface 21 disposed symmetrically with respect to a vertical axis, a bulging portion 22 on one side for forming the chin recess, and a long sloping convex section 23 on the other side for forming the nose and forehead section of the face piece. The side portions of the mold include bulging lens or eye piece sections 24 and the entire operative or active surface of the mold is bounded by a deep V-shaped groove 25 which extends in an upwardly and forwardly inclined direction across the sides of the mold and terminates in a convex shoulder below the chin forming portion of the mold.

In pulling over the conical blank upon this mold, the blank 15 is placed unsymmetrically upon the mold with a point in its forward slope in contact with the front edge of the cylindrical portion 20 of the mold. The blank is pulled strongly down over the rear surface of the mold and thus positioned unevenly thereon, that is to say, with a relatively short part of its length draped upon the forward half of the mold, and a relatively large portion of its area draped over the rear portion of the mold. The effect of this operation is to smooth the felt blank over the mold and shape it roughly and in a preliminary way to the contour thereof. In this operation the margin of the blank may be worked into the V-shaped groove or otherwise secured in shape. The upper edge of the groove defines the area of the blank required in the finished face piece, and conveniently indicates the lines upon which the face piece may be eventually trimmed.

A correspondingly shaped concave cap die 26 is then moved down forcibly upon the pulled over blank 15 and is retained in enclosing engagement with the blank until it has been substantially dried, which may be a matter of 5 to 10 minutes. The blank has thus been brought approximately to its final shape although it is at this stage limp and flexible in character. The partially molded blank 15 is represented in Fig. 4, as being lifted from the male mold after the concave die has been removed.

The molded face piece is now provided with a coating of film-forming solution which may be applied by a brush or dipping or any other convenient manner to its outer surface. Fig. 13 suggests the application of the exterior coating by means of a brush. The essential characteristics of the film are that it shall be continuous, gas-impervious and somewhat resilient. As examples of two satisfactory solutions we may use asphalt dissolved in "Hercolyn" in the proportion approximately 80 parts asphalt to 20 parts "Hercolyn" or ethyl cellulose plasticized to a high degree, for example, 50% ethyl cellulose dissolved in 50% castor oil. "Hercolyn" is an organic plasticizing agent, specifically a hydrogenated methyl abietate, commercially available upon the market. One of the solutions, or an equivalent solution, may be applied to the outside of the face piece as a lacquer being deposited upon and among the fibres of the molded article upon evaporation of the solvent. This continuous film forms an efficient barrier to and is impermeable by the poison gases used in chemical warfare, specifically chlorpicrin, Lewisite, mustard gas, Adamsite, E. D., etc.

Preferably a similar coating or film is applied to the inner surface of the molded article by a separate spraying operation or in the dipping or coating step previously described. Fig. 14 suggests the application of the interior coating by a spraying.

After the coatings have been dried and cured if necessary the face piece is subjected to final molding pressure under heavy hydraulic pressure. To this end the partially molded mask is placed within a mold cavity which is the reverse of the male mold and a form, usually made as a rubber plug, is inserted within the mask and inflated under high pressure thus forcing the mask into the facial shape determined by the mold cavity.

Suitable apparatus for this step of the process is shown in Figs. 6 to 8 in which the concave die cavity is represented as formed in a solid metal block or cylinder 30. In the bottom of this cavity is a circular recess 32 corresponding to the circular canister section of the face piece and a semi-elliptical cavity 33 corresponding to the chin portion 12. The metal cylinder 30 is provided at its upper edge with equally spaced hooked lugs 34 for interlocking with the corresponding molding element. This, as shown in Figs. 7 and 8, comprises a circular top plate 40 having radial ears 41 which may be interlocked with the hooked lugs 34 by a slight radial movement of the plate 40. Secured to the inner face of the plate 40 is a hollow rubber bag 42 having thick, strong walls, and a fluid pressure connection 43. The bag 42 is normally of such shape that it may be entered in the mold cavity 31 without disturbing the partially molded face piece 15. The latter is placed by hand in the mold cavity and if desired may be lined with a flexible lining or rigging. The outer face of this lining or rigging may be of such character as to impart the desired internal surface finish to the face piece. Then, when the top plate 40 is located in place, fluid under hydraulic pressure is admitted to the interior of the bag and it is expanded under high pressure against the interior of the coated and partially formed face piece. In this way the mask may be subjected to a pressure of about 125 to 300 lbs. per sq. in. and the mask retained under this pressure and at a temperature of 212 to 220° F. for a period of about a minute. The higher pressure is desirable, cutting down the time required and improving the ironing action on the surface. This inner molding step imparts the definite clear-cut contour to the face piece as shown in Fig. 1. It also imparts a smooth or hard rubber-like finish to the exterior of the face piece by molding its outer surface against the smooth metal of the mold cavity. At the same time the internal surface of the face piece is left with a felt-like or stippled surface configuration.

At the conclusion of the final molding operation the mask may be trimmed to the desired outline, which in this instance is that shown in Fig. 1, and thus is completed the article which is the subject matter of the present application.

In the further construction of the mask, apertures may be formed for eye pieces, for the exhalation valve, and for connection with the inhalation canister. In this connection is noted that the material of the mask lends itself well to the formation of gas tight enclosures, and has no objectionable tendency to fray when perforated.

In Figs. 9–12 is illustrated a modification of the process above described with a view to producing flanged lens holders in the mask. For this purpose the mold or die 50, having the cylindrical upper portion 51 and the V-shaped peripheral groove 52 as before, is provided in both cheek sections with a circular flanged boss 53. These may be attached to the body of the die 50 by any convenient means as by counter-sunk screws 54 one of which is shown in Fig. 10. In forming the mask the felt blank 55 is shaped upon the die 50, pulled down thereon and conformed to the die surface so as to enclose the bosses 53. A cord 56 is then passed about each boss drawing or gathering the material of the mask into the groove or valley beneath the flange of the boss, molding portions of the felt material outwardly against the circular walls of the boss, and stretching the material tightly across the outer face of the boss. The cord 56 is tied about both bosses, the upper part of the blank is pressed by a cap die, not shown, and the blank is then allowed to dry in approximately the final shape.

The molded face piece is now removed from the die and provided with a coating of film forming solution as above explained on its inner and outer surfaces by spraying or dipping. It will be understood that when the cord 56 is severed, the eye piece projections 57 may be stripped from the bosses 53 of the die.

After these coatings have been dried and cured if necessary the face piece is subjected to a final molding pressure under heavy hydaulic pressure by being placed in the recess of a female mold 60, similar to the mold of Figs. 7 and 8, but provided in this case with a circular recess 61 to receive the circular flanged lens holders which have been preliminarily formed by the bosses 53 of the mold die. In placing the face piece in this mold a circular rubber disck or rat 62 is slipped into the lens holder and a flat metal ring 63 is inserted in sections between the flange of the holder and the body of the face piece. Upon the inner surface of the face peice is placed a flexible lining or rigging 64 and finally the expansible rubber bag 65 is inserted in the mold cavity. Fluid under hydraulic pressure is now admitted to the interior of the bag, and it is expanded under high pressure against the interior of the cut out and partially formed face piece with a pressure of 200 or 300 lbs. per square inch. The face piece is retained under this pressure at an elevated temperature for a short time and thus a smooth rubber-like finish is imparted to the exterior of the face piece.

At the conclusion of the final molding operation the face piece is removed and the lens holder trimmed by the removal of its center portion in a circle concentric with the circumference thereof. The holder thus comprises a double flange circular frame in which the lens may be inserted and permanently secured in any desired manner in completing the mask. A complete face piece is shown in Fig. 12. In this figure the main body of the face piece has an outwardly directed annular flange 71 merging through a re-entrant angle into an inwardly directed annular flange 72. The annular space between the flanges 71 and 72 is occupied by the rim of the lens in the finished mask.

While we have shown herein a conical felted blank as the starting point of our improved face piece, it is contemplated that any hollow, three-dimensional blank of suitable shape may be employed so long as its material may be so arranged with respect to the contour of the molding surface that the fibres are maintained substantially in situ from start to finish and no substantial disturbance is brought about which would impart initial stresses to the final structure of the face pieces.

In naming two satisfactory solutions for coating or indurating the material of the face piece we do not wish to exclude others that may be satisfactory; for example, Vinylite plasticized with castor oil, or asphalt dissolved in toluene are satisfactory compounds, and their use may be desirable under certain conditions.

In producing the desired surface finish to the face piece it is important to lay down the felted fibres. This is effected to some degree in the preliminary molding operation and to quite a complete degree in the final hydraulic molding operation. It is facilitated by pouncing the felted blank at any time up to the preliminary molding operation, that is to say, by rubbing down the outside of the blank with pumice or sandpaper.

Final hydraulic molding of the coated face piece while the latter is subjected to substantial heat, results in a smooth rubberized surface finish, and in this step it is probable that whatever residual solution may remain in the fabric is released and the material of the coating is thus brought completely to its outer surface and incorporated in the surface finish.

This application is a continuation in part of our copending application Ser. No. 436,076, filed March 25, 1942, wherein we have claimed one embodiment of the novel face piece herein disclosed.

Having thus disclosed our invention and described in detail one manner of putting it into effect we claim as new and desire to secure by Letters Patent:

1. A process of making resilient face pieces for gas masks, which includes the steps of shaping a mixture of fibres into a hollow felted blank, pulling the blank thus formed and pre-shaped unsymmetrically over an upright mold so that one edge of the blank projects substantially below the level of the other, preliminarily molding the two sides of the blank into different contours, and then imparting a further and final modification in shape to the preliminarily molded blank.

2. A process of making resilient face pieces for gas masks, which includes the steps of shaping a mixture of fibres into a hollow felted blank, pulling the blank thus formed and pre-shaped unsymmetrically over an upright mold so that one edge of the blank projects substantially below the level of the other, molding a long convex section into the long side of the blank and a substantially circular bulge into the short side of the blank, coating the molded body thus produced with a resilient, gas-impervious film, and pressing the coated surfaces.

3. The process of making face pieces for gas masks which includes the steps of shaping a mixture of fibres into a hollow, seamless, felted blank, smoothing the surface of the blank, molding it into approximately three-dimensional face form with one edge of the blank projecting below the other, coating the molded article with resin plasticized by an organic plasticizer, and then finally shaping the coated article under heat and pressure thereby transforming the coating material into a smooth, resilient, gas-impervious coating tending to preserve the molded shape of the face piece against distortion.

4. The process of making face pieces for masks, which consists in conforming a felt blank to a die having circular projections in its surface, forming in the blank circular bosses defined by annular re-entrant angles by tying portions of the blank with a binder about said projections, removing the partially formed blank, coating it with a film-forming solution of asphalt, pressing the blank, and then cutting out circles concentric with and within said annular angles.

5. A process of making face pieces for masks which consists in conforming a felt blank to a die and simultaneously molding portions of the felt material outwardly in a circular projection, doubling the projecting material back in the walls of the projection to form a re-entrant annular channel, coating the blank with a film-forming solution of asphalt, pressing the blank, and then cutting away the material within the said re-entrant channel.

6. The process of making face pieces for masks, which consists in conforming a felt blank to a die, molding portions of the felt outwardly in a flange of circular contour, forming a re-entrant channel in the flanged portion of the felt, temporarily filling the channel, coating the entire blank with a solution forming a continuous gas-impervious film, pressing the blank while the filler is in place, and finally removing the felt within the boundary of the channel.

7. The process of making face pieces for masks which consists in conforming a felt blank to a die, gathering selected portions of the felt within a binder and molding them to form a circular projection having a re-entrant circular channel, temporarily placing a filler in the channel, temporarily placing a spacer beneath the channel, coating the blank with a solution forming a continuous gas-impervious film, pressing the blank, trimming the projection to present an annular inturned flange, and removing the filler and spacer.

8. The process of making face pieces for masks, which includes the steps of shaping a mixture of fibres into a hollow, seamless, felted blank of three dimensions, molding the blank into approximately three-dimensional face form and at the same time providing circular extensions in the material thereof by gathering selected portions within flexible binders and molding the gathered portions into projecting configurations having a double flange overlapping the body of the blank, temporarily supporting the flange internally and externally, coating the blank with a liquid forming a gas-impervious film, pressing the entire blank while the flange is thus supported, and then removing the support for the flange.

STANLEY P. LOVELL.
WILLIAM H. LEHMBERG.

REFERENCES CITED

The following references are of record in the file of this patent:

UNITED STATES PATENTS

| Number | Name | Date |
|---|---|---|
| 1,325,898 | Marquett | Dec. 23, 1919 |
| 1,884,342 | Stelzner | Oct. 25, 1932 |
| 1,794,192 | Lower | Feb. 24, 1931 |
| 2,016,568 | Zinser | Oct. 8, 1935 |
| 2,199,790 | Guinzburg | May 7, 1940 |
| 2,221,197 | Martin | Nov. 12, 1940 |
| 2,285,064 | Straw | June 2, 1942 |
| 2,295,855 | Ludwell | Sept. 15, 1942 |
| 2,128,745 | Huff | Aug. 30, 1938 |
| 2,300,912 | Dodge et al. | Nov. 3, 1942 |
| 2,251,477 | Wisman | Aug. 5, 1941 |
| 2,337,574 | Sloan et al. | Dec. 28, 1943 |
| 2,136,826 | Schur | Nov. 15, 1938 |
| 2,319,267 | Sawyer | May 18, 1943 |
| 1,691,005 | Burke | Nov. 6, 1928 |

FOREIGN PATENTS

| Number | Country | Date |
|---|---|---|
| 9,806 | British | 1885 |